(12) United States Patent  (10) Patent No.: US 7,869,423 B2
Ruohonen et al.  (45) Date of Patent: *Jan. 11, 2011

| | | | |
|---|---|---|---|
| (54) | SYSTEM AND METHOD FOR EXTENDING NEIGHBORING CELL SEARCH WINDOW | | |
| (75) | Inventors: | Jari J. Ruohonen, Tampere (FI); Tommy Bysted, Smoerum (DK); Vesa Savela, Tampere (FI) | |
| (73) | Assignee: | Nokia Corporation, Espoo (FI) | |
| ( * ) | Notice: | Subject to any disclaimer, the term of this patent is extended or adjusted under 35 U.S.C. 154(b) by 0 days. | |
| | | This patent is subject to a terminal disclaimer. | |
| (21) | Appl. No.: | 12/635,900 | |
| (22) | Filed: | Dec. 11, 2009 | |
| (65) | | Prior Publication Data | |
| | US 2010/0091744 A1 | Apr. 15, 2010 | |
| | | Related U.S. Application Data | |
| (63) | Continuation of application No. 10/356,675, filed on Jan. 31, 2003, now Pat. No. 7,633,927. | | |
| (51) | Int. Cl. H04B 7/15 (2006.01) | | |
| (52) | U.S. Cl. ................. 370/350; 455/502; 370/337 | | |
| (58) | Field of Classification Search ........... None See application file for complete search history. | | |
| (56) | | References Cited | |

U.S. PATENT DOCUMENTS

| | | | |
|---|---|---|---|
| 5,228,029 A | 7/1993 | Kotzin | |
| 5,404,573 A | 4/1995 | Yabe et al. | |
| 5,528,597 A | 6/1996 | Gerszberg et al. | |
| 5,729,539 A | 3/1998 | Heeschen et al. | |
| 6,044,270 A | 3/2000 | Raith | |
| 6,223,036 B1 | 4/2001 | Kuwabara | |
| 6,308,068 B1 * | 10/2001 | Kunkel | 455/434 |
| 6,377,803 B1 | 4/2002 | Ruohonen | |
| 6,577,641 B1 * | 6/2003 | Izumi | 370/442 |

FOREIGN PATENT DOCUMENTS

| | | |
|---|---|---|
| EP | 1330136 | 7/2003 |
| KR | 20020092401 | 12/2002 |
| WO | WO0141482 | 6/2001 |

OTHER PUBLICATIONS

3rd Generation Partnership Project; Technical Specification Group GSM/EDGE Radio Access Network; Radio subsystem link control, 3GPP TS 05.08, v8.14.0 (Apr. 2002), (Release 1999).

3rd Generation Partnership Project; Technical Specification Group GSM/EDGE Radio Access Network; Multiplexing and multiple access on the radio path, 3GPP TS 05.02, v8.10.0 (Aug. 2001), (Release 1999).

* cited by examiner

*Primary Examiner*—Phuoc Doan
(74) *Attorney, Agent, or Firm*—Hollingsworth & Funk, LLC

(57) ABSTRACT

A system and method for accommodating mobile station synchronization to neighbor cells in a mobile communication system. At least one available frame is utilized as a search window in an uplink data transfer multiframe for receiving neighboring cell synchronization information. At least one transmit time slot in a frame adjacent to the available frame in the uplink data transfer multiframe is surrendered to extend the search window. The neighboring cell synchronization information may then be contiguously received via the extended search window.

21 Claims, 7 Drawing Sheets

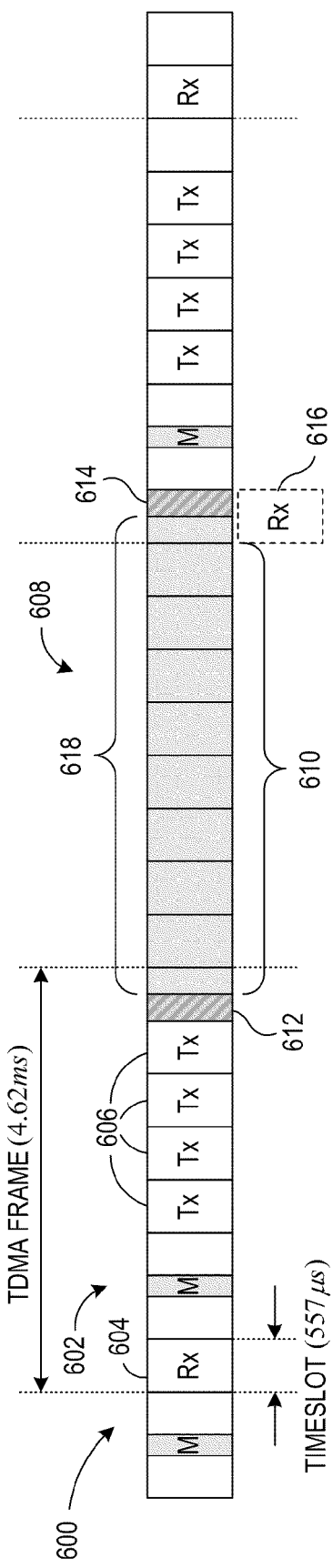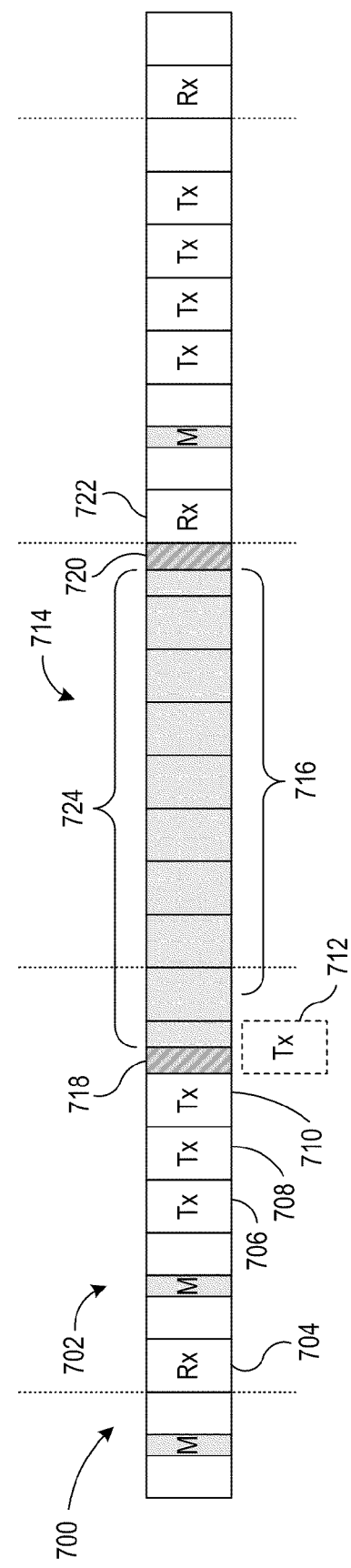

SYSTEM AND METHOD FOR EXTENDING NEIGHBORING CELL SEARCH WINDOW

RELATED APPLICATIONS

This application is a continuation of prior U.S. application Ser. No. 10/356,675, filed Jan. 31, 2003 now U.S. Pat. No. 7,633,927, which is incorporated herein by reference in its entirety.

FIELD OF THE INVENTION

This invention relates in general to wireless communications, and more particularly to a system and method for accommodating mobile station synchronization to neighbor cells by providing an extended search window allowing the mobile station to receive neighbor cells in an efficient manner.

BACKGROUND OF THE INVENTION

In recent years, the utilization of wireless communication systems for communicating telephonically has achieved astonishing popularity. Conventional, voice communications as well as data communications can be effected telephonically through the use of such wireless communication systems.

In a wireless communication system, the communication channel formed between a sending and a receiving station is a radio channel, operating in a portion of the electromagnetic spectrum. A wire line connection is not required to effectuate the communication of a communication signal between the sending and receiving stations. Thus, communication via a wireless communication system is possible at locations to which formation of a wire line connection would be impossible or otherwise impractical.

Cellular communication systems have been implemented using various communication schemes. Cellular communication systems have been developed which utilize, for example, FDMA (frequency-division, multiple-access), TDMA (time-division, multiple-access), and CDMA (code-division, multiple-access) techniques, as well as various combinations of such techniques. A cellular communication system includes network infrastructure including a number of separated base transceiver stations, formed of fixed-site radio transceivers. Users communicate with the infrastructure of a cellular communication network through the use of a radio telephone or other communicator, typically referred to as a mobile station. The mobile station receives downlink signals on a forward link and transmits uplink signals on a reverse link. In this manner, bidirectional communications are provided between the infrastructure of the cellular communication network and the mobile station.

For the successful operation of a cellular communication system, synchronization is required between mobile stations and the base transceiver station. Such synchronization generally comes in two forms, including frequency synchronization and time synchronization of the frames and bits. Frequency synchronization is needed in order to ensure that the mobile station is synchronized to the carrier frequency of the BTS. Bit and frame synchronization provides adjustment of the propagation time differences of signals from different mobile stations so that transmitted "bursts" are received synchronously with the time slots of the base transceiver station, and so bursts in adjacent time slots do not overlap. Bit and frame synchronization is also required for the frame structure due to a higher-level superimposed frame structure for mapping logical signaling channels onto a physical channel.

Furthermore, when a mobile terminal is operating in a cellular communication system, it has to be synchronized to neighboring cells. In order to do this, the mobile station attempts to receive synchronization channels such as Frequency Correction Channels (FCCH) and Synchronization Channels (SCH) of the neighboring cells at certain intervals. On traffic channels, most of the TDMA frames are used for transferring data or speech, and limited available frames exist in which such synchronization information may be received. Partial searches can be performed at different frames to collectively provide the desired search result. However, within any given available frame, the number of time slots available are also limited, which can further spread out the searching operation unless enough consecutive times slots can be made available to account for all of the possible places in time that a synchronization signal such as an FCCH can present itself.

With the introduction of higher-level multislot classes, the consecutive time slots associated with a frame and available for receiving neighboring cell synchronization information becomes prohibitively limited. In many cases, there are not enough time slots to cover the range of times in which an FCCH or other synchronization signal can be presented, and the receipt of FCCH information must carry over to subsequent frames. This can cause significant delays and adversely affect communication throughput.

One prior art manner that addresses this is described in 3GPP TS 05.08, V8.14.0 (2002-04), "$3^{rd}$ Generation Partnership Project; Technical Specification Group GSM/EDGE Radio Access Network; Radio Subsystem Link Control" (Release 1999), which is incorporated herein in its entirety. This specification indicates that the MS may skip receive operations for neighbor reception purposes. This results in the Rx operation after the idle frame being skipped to provide the requisite time slots for receiving the FCCH and SCH information. While this may not be necessary for unidirectional downlink data transfer (e.g., where sufficient downlink time slots are allocated), unnecessary breaks in the downlink and/or uplink data transfer can occur when skipping Rx operations during unidirectional uplink and bidirectional uplink/downlink data transfer. When using Uplink State Flag (USF), for example, for allocation of uplink resources, this decreases throughput for both downlink and uplink data transfers, since a permission to send uplink data is received in a downlink data block. By skipping Rx operations in the downlink direction, this permission to send uplink data may be missed, causing further delays. This problem is exacerbated when extended dynamic allocation or USF granularity (or both) are used, since one Rx block may provide permission to send multiple Tx blocks.

Accordingly, there is a need in the communications industry for a manner of receiving neighbor cell synchronization information that minimizes the impact of widening the associated search window. The present invention fulfills these and other needs, and offers other advantages over the prior art.

SUMMARY

To overcome limitations in the prior art described above, and to overcome other limitations that will become apparent upon reading and understanding the present specification, the present invention discloses a system, apparatus and method for accommodating mobile station synchronization to neighbor cells by providing an extended search window allowing the mobile station to efficiently receive neighbor cells. One or more transmit (Tx) time slots are skipped in an available frame adjacent to a block of time slots available for receiving neighbor synchronization information. In this manner, the search window for receiving such synchronization information can be expanded, without the negative consequences associated with prior art synchronization methodologies.

In accordance with one embodiment of the invention, a method is provided for accommodating mobile station synchronization to one or more neighbor cells in a mobile communication system. The mobile communication system includes base transceiver stations (BTS) each defining a cell, and at least one mobile station (MS) capable of communicating with at least one BTS. The method includes utilizing at least one available frame as a search window in an uplink data transfer multiframe for receiving neighboring cell synchronization information. At least one transmit time slot in a frame adjacent to the available frame in the uplink data transfer multiframe is surrendered or "skipped" to extend the search window. The neighboring cell synchronization information is then received in the extended search window.

The following describes various particular embodiments of such a method. For example, in accordance with one particular embodiment of such a method, surrendering at least one transmit time slot in a frame adjacent to the available frame involves surrendering at least one transmit time slot in a frame immediately preceding the available frame. In a more particular embodiment, this may involve surrendering at least one transmit time slot from the immediately preceding frame that is closest to the available frame to provide contiguous time slots in the extended search window. In another particular embodiment, the method includes maintaining an end boundary of the available frame to prevent disturbing a successive frame contiguous with the available frame. Another particular embodiment involves surrendering as many transmit time slots as necessary to provide the extended search window at a size capable of accommodating all of the neighboring cell synchronization information, and in other embodiments receive slots may also be surrendered in the frame adjacent to the available frame and opposite the frame in which the at least one transmit time slot was surrendered, in order to further extend the search window. In still other particular embodiments, the neighboring cell synchronization information includes a Frequency Correction Burst (FB) associated with a Frequency Correction Channel (FCCH) and/or a Synchronization Burst (SB) associated with a Synchronization Channel (SCH). In one particular embodiment, utilizing the available frame(s) as a search window involves utilizing at least one defined Idle Frame in the uplink data transfer multiframe. Another particular embodiment involves utilizing any one or more frames in the uplink data transfer multiframe having a plurality of contiguous available time slots. In other particular embodiments, the MS is associated with an MS multislot class that accommodates fewer consecutive available time slots than are available in the search window prior to extension, where surrendering the transmit time slot(s) may involve surrendering a number of transmit time slots required to accommodate the MS multislot class. In one particular embodiment, this may involve surrendering a number of transmit time slots required to provide ten consecutive time slots, inclusive of the time necessary for MS radio frequency circuitry to change between a data transfer channel and a synchronization channel. One particular embodiment of such a method involves at least partially synchronizing the MS with a neighboring cell corresponding to the synchronization information retrieved via the extended search window, and another embodiment involves repeating a search for the neighboring cell synchronization information in a plurality of the available frames to facilitate the receiving of the neighboring cell synchronization information in the extended search window of at least one of the plurality of available frames. The synchronization information in one embodiment includes a Frequency Correction Burst (FB) associated with a Frequency Correction Channel (FCCH), where the method further includes determining a location of a Synchronization Channel (SCH) based on a location of the FCCH and receiving the SCH in an available frame at least one multiframe after the FCCH using a timing offset relative to a timing offset of the FCCH. The MS of one embodiment may be of a type in which transmit and receive operations are not simultaneously performed, such as a type-1 MS.

In accordance with another embodiment of the invention, a Mobile Station (MS) is provided, where the MS is operable in a wireless network having a plurality of cells each defined by a Base Transceiver Station (BTS). The MS includes a transceiver to communicate with a plurality of neighboring BTSs to receive synchronization channels transmitted by the neighboring BTSs. The MS also includes a processing module configured to extend a search window in an uplink data transfer multiframe by sacrificing one or more transmit time slots in a frame of the uplink data transfer multiframe adjacent to an available frame where receipt of synchronization channels are expected.

In accordance with another embodiment of the invention, a system is provided for synchronizing communications in a mobile communication system. The system includes a number of cells each defined by a Base Transceiver Station (BTS), and at least one Mobile Station (MS) for communicating with some of the BTSs neighboring the cell in which the MS is currently operating. The MS includes a transceiver to communicate with the plurality of the neighboring BTSs to receive synchronization channels transmitted by the neighboring BTSs, and further includes a processing module configured to extend a search window in an uplink data transfer multiframe by surrendering one or more transmit time slots in a frame of the uplink data transfer multiframe adjacent to an available frame where receipt of synchronization channels are expected.

In accordance with another embodiment of the invention, a computer-readable medium is provided which includes stored instructions that are executable by a computer system for accommodating mobile station synchronization to one or more neighbor cells in a mobile communication system. The mobile communication system includes base transceiver stations (BTS) each defining a cell, and at least one mobile station (MS) capable of communicating with at least one BTS. The instructions stored on the computer-readable medium performs steps including utilizing at least one available frame as a search window in an uplink data transfer multiframe for receiving neighboring cell synchronization information, surrendering at least one transmit time slot in a frame adjacent to the available frame in the uplink data transfer multiframe to extend the search window, and receiving the neighboring cell synchronization information in the extended search window.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention

BRIEF DESCRIPTION OF THE DRAWINGS

The invention is described in connection with the embodiments illustrated in the following diagrams.

FIG. 6 illustrates an example frame portion for an MSC-12 (1+4) configuration;

FIG. 7 illustrates an example frame portion for an MSC-12 (1+4) configuration implementing the principles of the present invention;

DETAILED DESCRIPTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a system and method for accommodating mobile station synchronization to neighbor cells by providing an extended search window allowing the mobile station to receive neighbor cells in an efficient manner. One or more Tx slots, in the radio block period adjacent to an idle frame used to receive neighbor synchronization information, are skipped in order to allow expansion of the search window. By expanding the search window in this fashion, other time slot operations such as Rx operations need not be disrupted which can otherwise cause substantial inefficiencies.

Figure 1:
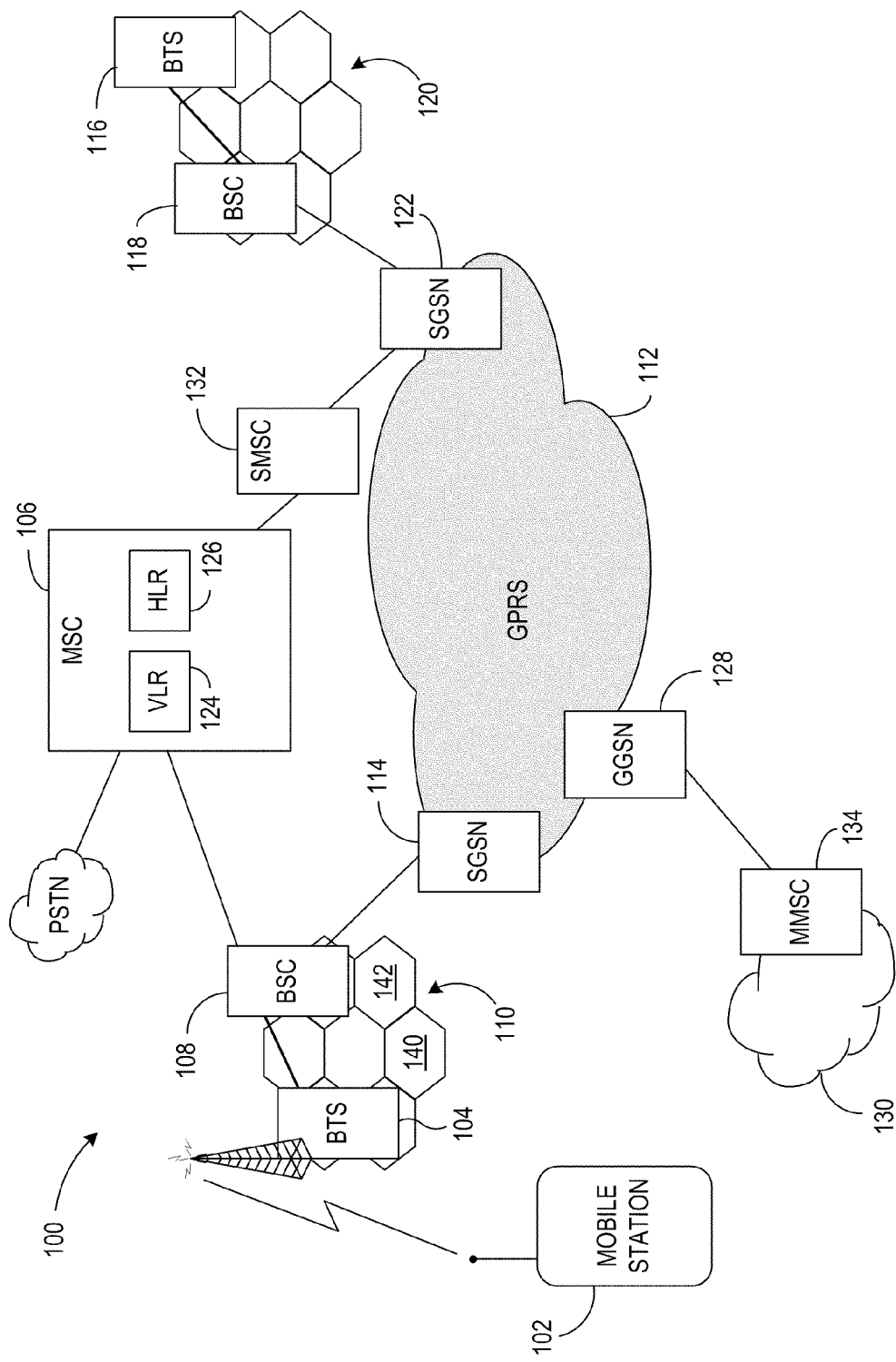
FIG. 1 illustrates some general aspects of a GSM/GPRS network environment in which the principles of the present invention may be utilized.

The present invention is applicable in any type of mobile communication systems/networks where synchronization to neighboring cells may be required. In order to facilitate an understanding of the invention, the present invention is described in terms of a GSM/GPRS network. However, those skilled in the art will readily appreciate from the description provided herein that the present invention is equally applicable to analogous networking environments. FIG. 1 illustrates some general aspects of a GSM/GPRS network environment 100 in which the principles of the present invention may be utilized.

Global System for Mobile communications (GSM) is a digital cellular communications system serving as a Public Land Mobile Network (PLMN), where multiple providers may set up mobile networks following the GSM standard. GSM is capable of providing both voice and data services. A GSM (or analogous) network 100 typically includes components such as Mobile Stations (MS) 102, Base Transceiver Stations (BTS) 104, Mobile Switching Center (MSC) 106, etc. A GSM network may be viewed as a collection of various subsystems, including the Radio Subsystem (RSS) which covers radio aspects, Network and Switching Subsystem (NSS) which manages functions such as call forwarding, handover and switching, and the Operation Subsystem (OSS) that manages the network. Various aspects of the RSS is described in greater detail below.

One or more MSs 102 communicate with the BTS 104 via an air interface. The BTS 104 is a component of a wireless network access infrastructure that terminates the air interface over which subscriber traffic is communicated to and from the MS 102. The Base Station Controller (BSC) 108 is a switching module that provides, among other things, handoff functions, and controls power levels in each BTS 104 of the Base Station System (BSS) 110. The BSC 108 controls the interface between the Mobile Switching Center (MSC) 106 and BTS 104 in a GSM mobile wireless network, and thus controls one or more BTSs in the call set-up functions, signaling, and in the use of radio channels.

A General Packet Radio System (GPRS) mobile communications network 112 is a packet-switched service for GSM that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. The BTS 104 also controls the interface between the Serving GPRS Support Node (SGSN) 114 and the BTS 104 in a GPRS network 112. Other BTS, BSC, and SGSN components may also be associated with the network system, as depicted by BTS 116 and BSC 118 of BSS 120, and SGSN 122.

The MSC module 106 generally includes the MSC, Visiting Location Register (VLR) 124, and Home Location Register (HLR) 126. The MSC 106 performs a variety of functions, including providing telephony switching services and controlling calls between telephone and data systems, switching voice traffic from the wireless network to the landline network if the call is a mobile-to-landline call, or alternatively switching to another MSC if the call is a mobile-to-mobile call. The MSC 106 also provides the mobility functions for the network, and serves as the hub for multiple BTSs. Generally, it is the MSC 106 that provides mobility management for subscribers, in order to register subscribers, and authenticate and authorize services and access for subscribers. In GSM systems, some of the functionality of the MSC 106 may be distributed to the BSC 108, while in other systems such as TDMA systems, the BSC 108 functions are often integrated with the MSC 106.

Associated with the MSC 106 is the HLR 126 and VLR 124. The HLR 126 is a database that stores information about subscribers in the mobile network, and is maintained by one or more service providers for their respective subscribers. The MSC 106 uses the information stored in the HLR 126 to authenticate and register the subscriber by storing permanent subscriber information including the service profile, the current location of mobile stations, and activity status of the mobile user. The VLR 124 is a database that may be maintained by the MSC 106 to keep track of all the visiting mobile stations within a mobile telephony system.

The Serving GPRS Support Nodes (SGSN) 114, 122 serve GPRS mobile by sending or receiving packets via a respective BSS 110, 120, and more particularly via the BSC 108, 118 in the context of GSM systems. The SGSN is responsible for the delivery of data packets to and from the mobile stations within its service area, and performs packet routing and transfer, mobility management, logical link management, authentication, charging functions, etc. In the exemplary GPRS embodiment shown in FIG. 1, the location register of the SGSN 114 stores location information such as the current cell and VLR associated with the MS 102, as well as user profiles such as the International Mobile Subscriber Identity Number (IMSI) of all GPRS users registered with this SGSN. Another network element introduced in the GPRS context is the Gateway GPRS Support Node (GGSN) 128, which acts as a gateway between the GPRS network 112 and a packet switched public data network, such as data network 130. This gateway 128 allows mobile subscribers to access the public data network 130 or specified private IP networks. The connection between the GGSN 128 and the public data network is generally enabled through a standard protocol, such as the Internet Protocol (IP).

A variety of other network elements may be employed, such as a Short Message Service Center (SMSC) 132. The SMSC 220 is a network element through which short messages (e.g., via Short Messaging Service) may be transmitted, and stored for later transmission in the event that the message recipient is not reached. The MS 102 may access other services, such as a Multimedia Messaging Service (MMS) provided via the Multimedia Message Service Center (MMSC) 134.

When an MS 102 is operating in a GSM network such as the GSM network environment 100 of FIG. 1, it has to be synchronized to neighbor cells. In order to do this, the MS 102 attempts to receive certain synchronization channels of the neighboring cells at certain intervals. A background of the various radio interface channels is provided below.

As previously indicated, the RSS includes components such as MSs, and the BSS which in turn generally includes a plurality of BTSs and a BSC. The BTS includes radio components such as a transceiver and antenna, while the BSC effects switching between BTSs, manages network resources, etc. The RSS supports a certain number of logical channels that fall within two primary categories including the traffic channels (TCH) and the control channels (CCH). The TCHs are intended to carry data such as encoded speech or user data in circuit switched mode, while Packet Data TCHs (PDTCH) are intended to carry user data in packet switched mode. Multiple full rate channels and multiple packet data TCHs can be allocated to the same MS, which is referred to as multislot configurations and multislot packet configurations respectively.

Control channels carry signaling and/or synchronization data. There are currently four primary control channel categories in GSM systems, including broadcast, common, dedicated, and CTS control channels. Of particular interest with respect to the present invention are the broadcast control channels. The broadcast channels include Frequency Correction Channels (FCCH), Synchronization Channels (SCH), a Broadcast Control Channel (BCCH) as well as Packet BCCH (PBCCH) channels. As previously indicated, when an MS 102 is operating in a GSM network, it has to be synchronized to neighbor cells. In order to do this, the MS 102 attempts to receive FCCH and SCH channels of the neighboring cells at certain intervals. For example, if the selected cell corresponds to the cell of BTS 104, the neighboring cells in which FCCH and SCH channels are to be received may include cells 140, 142, etc. Approximate timing for a neighbor cell is available when FCCH information has been received successfully. The timing and frequency synchronization can be further improved by a successful SCH reception.

More particularly, the FCCH carries information for frequency correction of the MS 102, and is essentially the repeated transmission of Frequency correction Bursts (FB). FBs provide a predetermined number of bits of information, such as one hundred forty-two bits of information, as well as tail and guard periods. This information is transmitted periodically from the BTS to notify the MSs of frequency adjustments. The information transmitted is generally null data, i.e., binary zeros, which corresponds to broadcasting an unmodulated carrier—a sine wave. Using this information, the MS can identify the channel. The SCH is also used for synchronization. Synchronization Bursts (SB) on the SCH transmit information which allows the MS to synchronize time-wise with the BTS. SBs are structured such that they include data bits and synchronization bits, which includes a Base Transceiver Station Identity (BSIC) as well as a Reduced TDMA Frame Number (RFN). The RFN is essentially the running number of the TDMA frame, which facilitates frame synchronization and allows each MS to be time-synchronized with the BTS. Repeated broadcasting of SBs is considered the SCH.

Figure 2:
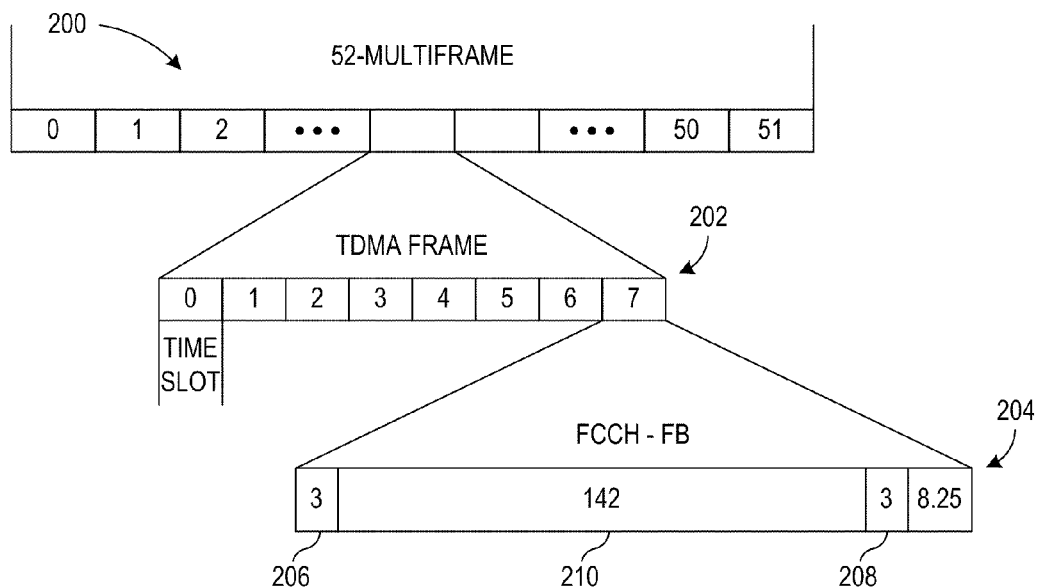
FIG. 2 illustrates a representative multiframe hierarchy in which search windows may be manipulated in accordance with the present invention.

In connection with mapping in time of packet logical channels onto physical channels, a physical channel allocated to carry packet logical channels is referred to as a Packet Data Channel (PDCH). PDCHs are generally mapped dynamically onto a 52-frame multiframe. FIG. 2 illustrates an example of a multiframe 200, which includes fifty-two frames (0-51). Each TDMA frame 202 generally includes eight time slots (0-7). The length of a typical FCCH burst (i.e., Frequency Correction Burst; FB) is one time slot, such as depicted by time slot 204. Three tail bits 206, 208 and one hundred forty-two data bits 210 are all set to zero in the FB to generate a pure sine wave (PSW) signal. This general multiframe structure is used by the monitoring MS TCH/PDCH, as well as by the neighboring cell BCCH. From the neighboring cell point of view, an FB is periodically transmitted by the BTS on the BCCH carrier. It is these FCCH or FB bursts that are monitored by an MS when attempting to receive synchronization channels in an appropriate TCH/PDCH frame 202 from neighbor cells/BTSs.

The FCCH of neighboring cells occurs every $10^{th}$ or every $11^{th}$ frame in the 51 TDMA multiframe structure; the last gap before the next 51-multiframe start is ten frames. In idle mode, the FCCH can be received by a monitoring MS via a continuous search lasting twelve frames. The continuous search is possible in idle mode since most of the TDMA frames are free for these operations. The corresponding SCH is then located in the next TDMA frame having the same timing offset as the FCCH. On traffic channels, most of the TDMA frames are used for transferring data, fax, speech, etc., and the only available frames in the 52 TDMA multiframe structure are the so-called "idle frames" which occur every $26^{th}$ TDMA frame. Consequently the MS has to perform the search for FCCH in smaller sections. In practice, this means that one partial FCCH search should last at least nine consecutive time slots in order to cover all possible places in the time domain in which the FCCH information may occur during one TDMA frame. Also, SCH reception requires a nine time slot-wide reception window to cover all possible timing offsets where SCH burst can be received.

Figure 3:
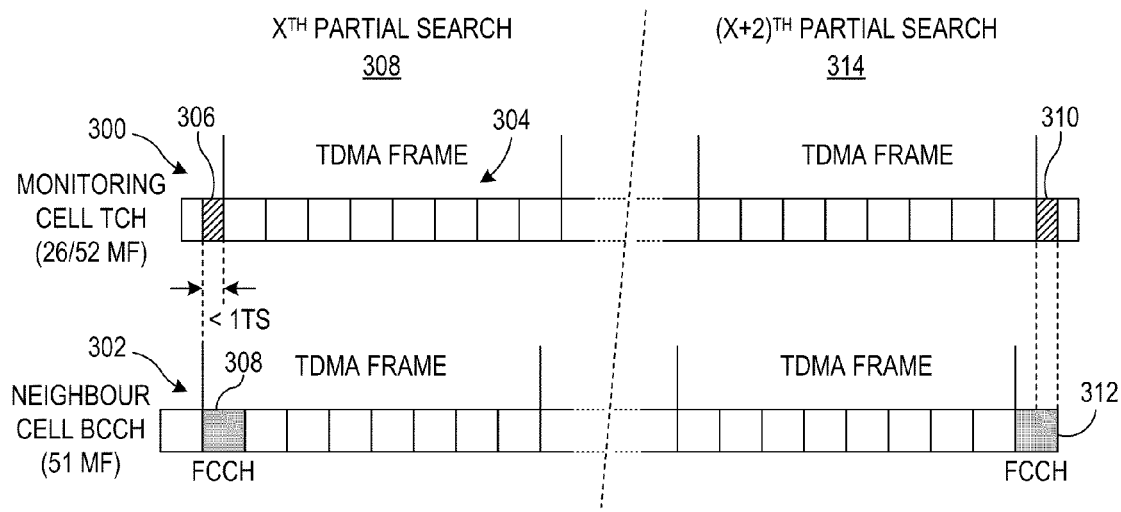
FIG. 3, which illustrates a representative 52-multiframe relationship between the monitoring MS TCH and a neighbor cell BCCH.

This situation is depicted in FIG. 3, which illustrates a representative 52-multiframe relationship between the monitoring MS TCH 300 and a neighbor cell BCCH 302. Since the neighbor cell FCCH burst 302 (that the monitoring MS is attempting to receive) is not synchronized with the cell where the monitoring MS is camped, the FCCH burst 302 may be placed anywhere in the time domain. Thus, during one TDMA frame 304 of the monitoring MS data channel (e.g., the "idle frame" from the monitoring MS point of view), the neighbor FCCH burst 302 can begin in any time between 0 ms and 4.615 ms in the case of 156.25-bit, 8-slot TDMA frames. The length of the FCCH burst is one time slot (4.615/8 ms), so to cover all possibilities to receive one complete FCCH burst the reception or "search window" should last at least 9 time slots. For example, if the search window were only 8 slots wide, only a portion 306 of the FCCH burst 308 of the neighbor cell multiframe 302 would be captured in the search window during the $X^{TH}$ partial search. The remaining portion 310 of the FCCH burst 312 would be captured in another idle frame during a subsequent, $(X+2)^{TH}$ partial search 314. Thus, in order to ensure that the FCCH burst can be captured without such a temporal division, 9 time slots should be used to accommodate for all possible times in which the FCCH burst can occur.

When higher GPRS, High Speed Circuit Switched Data (HSCSD), or other similar services supporting multislot classes are taken into use, there is a problem of obtaining 9 consecutively available time slots for neighbor FCCH and SCH receive (Rx) operations, since Rx and transmit (Tx) operations occupy most of the time slots. More particularly, a practical implementation would require at least ten consecutively available time slots, since the MS radio frequency (RF) components/circuitry has to change frequency between the data transfer channel and the channel for the neighboring Rx operation, which requires a certain switching time for type-1 mobile stations having only a single RF capability (i.e., no concurrent Rx and Tx operations).

Whether a particular type-1 mobile may experience problems in this regard depends on the multislot class of the device as well as the Rx/Tx slot configuration for that multislot class. Table 1 below representative examples of particular multislot classes:

TABLE 1

| MULTISLOT CLASS | MAXIMUM NUMBER OF SLOTS | | |
| --- | --- | --- | --- |
| | Rx | Tx | SUM |
| 1 | 1 | 1 | 2 |
| 2 | 2 | 1 | 3 |
| ... | | | |
| 6 | 3 | 2 | 4 |
| ... | | | |
| 10 | 4 | 2 | 5 |
| 11 | 4 | 3 | 5 |
| 12 | 4 | 4 | 5 |

Multislot classes are product-dependent, and determine the maximum data rates that are achievable in both the uplink and downlink. For example, multislot class 6 (MSC-6) can include a sum of four slots per frame for data transmission, with up to three Rx slots and up to two Tx slots. The particular configuration is written in the format "X+Y", where X represents the quantity of downlink time slots, and Y represents the quantity of uplink time slots. Thus, a multislot class of MSC-6 (3+1) represents multislot class 6, with three downlink (Rx) timeslots and one uplink (Tx) timeslot per frame.

Current 3GPP specifications (i.e., 3GPP TS 05.08) allow, for some multislot configurations, Rx operations related to data transfer in the downlink direction to be skipped to provide the requisite search window for neighbor reception purposes. While this may not be necessary for unidirectional downlink data transfer, unnecessary breaks in the downlink and/or uplink data transfer can occur when skipping Rx operations during unidirectional uplink and bidirectional uplink/downlink data transfer. When using an Uplink State Flag (USF) or other analogous indicator for allocating uplink resources, this decreases throughput for both downlink and uplink data transfers, since a permission to send uplink data is received in a downlink data block. More particularly, for each data channel (PDCH in the case of GPRS service) allocated to the MS, a USF is provided to the MS. Physical channels for packet switched transmission are only allocated for a particular MS when the MS sends or receives data packets, and are released after the transmission. Using this "dynamic allocation" principle, multiple MSs can share one physical channel. To prevent collisions, the network indicates which channels are currently available in the downlink. The USF in the header of downlink packets shows which MS is allowed to use this channel in the uplink. Thus, by skipping Rx operations in the downlink direction, this permission to send uplink data may be missed, causing further delays. This problem is exacerbated when extended dynamic allocation or USF granularity (or both) are used, since one Rx block may provide permission to send multiple Tx blocks.

Figure 4:
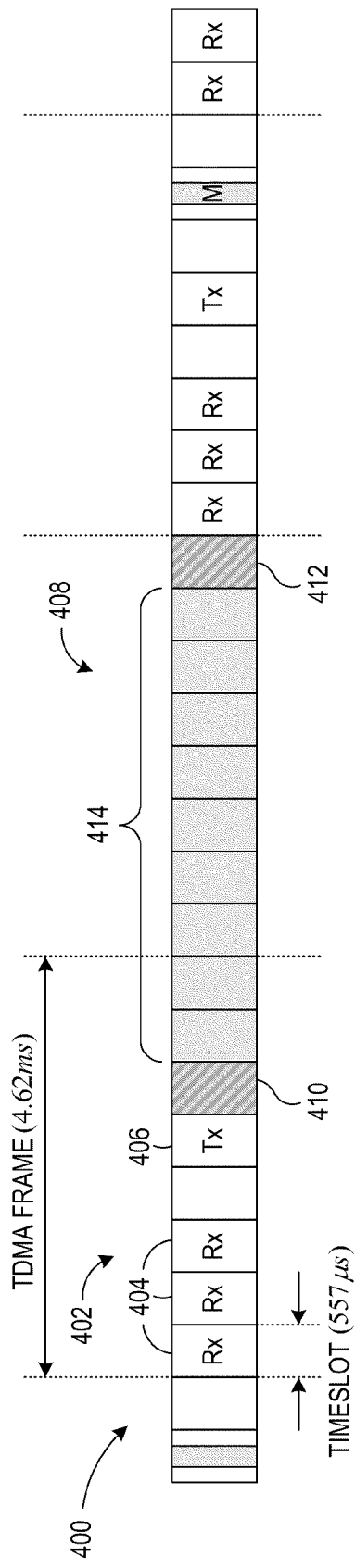
FIG. 4 illustrates an example frame portion for an MSC-6 (3+1) configuration.

FIGS. 4-7 illustrate these multislot class considerations. FIG. 4 illustrates an example frame portion 400 for an MSC-6 (3+1) configuration. In this example, a TDMA frame 402 for the uplink includes three Rx time slots 404 and one Tx time slot 406. An idle frame 408 is used to receive the FCCH burst. For this configuration, eleven time slots are available, including two time slots 410, 412 to provide the MS with the appropriate switching time for its RF circuitry, and nine time slots comprising the FCCH search window 414 for receiving the FCCH information (also generally referred to as Neighbor Pure Sine Wave; NPSW). Therefore, with this configuration, there is no particular problem, as the FCCH search can be performed without having to receive FCCH information non-contiguously in different idle frames.

Figure 5:
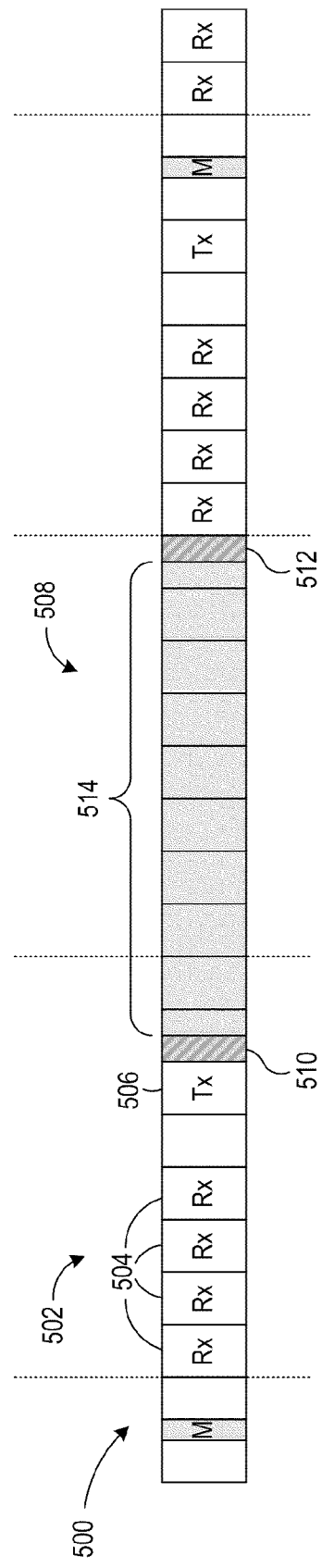
FIG. 5 illustrates an example frame portion for an MSC-10 or MSC-11 (4+1) configuration.

FIG. 5 illustrates an example frame portion 500 for an MSC-10 or MSC-11 (4+1) configuration. In this example, a TDMA frame 502 for the uplink includes four Rx time slots 504 and one Tx time slot 506. An idle frame 508 is used to receive the FCCH burst. For this configuration, ten time slots are available, including two partial time slots 510, 512 to provide the MS with the appropriate switching time for its RF circuitry. This example assumes that the MS RF circuitry can change frequency in half of a time slot period (e.g., 577 μs/2). Otherwise, this configuration would pose a problem, as 9 consecutive available time slots would not be attainable. However, in the example of FIG. 5, nine time slots are available for the FCCH search window 514 to receive the FCCH information.

FIG. 6 illustrates an example frame portion 600 for an MSC-12 (1+4) configuration. In this example, a TDMA frame 602 for the uplink includes one Rx time slot 604 and four Tx time slots 606. An idle frame 608 is used to receive the FCCH burst. For this configuration, the originally available search window 610 includes less than nine available time slots, due to the need for two partial time slots 612, 614 to provide the MS with the appropriate switching time for its RF circuitry. In order to accommodate for this, the MS may be allowed to skip Rx operations after the idle frame for neighbor reception purposes. This results in the Rx operation 616 being skipped to provide the requisite nine time slots for receiving the FCCH information as shown by the new search window 618. This decreases throughput for both downlink and uplink data transfers since the USF field is received in a downlink data block. Where extended dynamic allocation and/or USF granularity are used, one Rx block may provide permission to send multiple Tx blocks, and thus the problem may be exacerbated.

The present invention addresses these problems. Rather than skipping downlink receive (Rx) operations, the search window is widened by skipping transmit (Tx) operations for uplink data transfer before the idle frame where FCCH or SCH reception is performed. The search window may be widened by skipping as many Tx operations as necessary to obtain the requisite search window width. In this manner, skipping the Rx block after the idle frame can be avoided, and the network can thus use this block to allocate resources to the MS(s). Thus, the invention has a positive impact on downlink data since no downlink operations need to be skipped. Further, this is particularly beneficial in the context of extended dynamic allocation and/or USF granularity use, where the network can use the first block to allocate several uplink time slots to the MS. This way, the receipt of the USF value, for example, in the next period can be effected from all four bursts comprising a GPRS radio block. As a more particular example, with MSC-12 when extended dynamic allocation and USF granularity is used, this USF may grant permission to send up to 16 uplink blocks, and it is more significantly more efficient to ensure receipt of the permission for sending these multiple uplink blocks relative to losing a single uplink block. Besides allocating resources to the MS, the network can use the first Rx block after the idle frame to send a control or data block which can also contain polling for requesting the mobile stations to send an uplink control block.

FIG. 7 illustrates an example frame portion 700 for an MSC-12 (1+4) configuration implementing the principles of the present invention. In this example, a TDMA frame 702 for the uplink generally includes one Rx time slot 704 and four Tx time slots 706, 708, 710, and 712. An idle frame 714 is used to receive the FCCH burst. The originally available search window 716 includes less than nine available time slots, due to the need for two partial time slots 718, 720 to provide the MS with the appropriate switching time for its RF circuitry. In accordance with the present invention, the Rx operation 722 need not be skipped. Rather, the last Tx slot(s) in the frame 702 prior to the idle frame 714 is surrendered in order to widen the search window as shown by the new search window 724. With this widened search window 724, nine contiguous time slots are available for receiving the FCCH information, without the negative impact associated with skipping Rx operations 722 after the idle frame 714. It should be noted that MCS 12 is depicted here for purposes of illustration, but the problem will be significantly more pronounced for other higher multislot classes for type-1 mobile stations (e.g., multislot class 30-45) when extended dynamic allocation or similar functionality is used.

When this kind of search is repeated in a plurality of successive idle frames, the neighbor synchronization information shall occur during one of the extended search windows. For example, in the GSM/GPRS environment, this kind of search is repeated in thirteen consecutive idle frames, the place for the neighbor FCCH burst will occur during one of the search windows. This is a consequence of different multiframe structures between common control channels (e.g., BCCH) and dedicated/shared channels (e.g., TCH, PDTCH, etc.). After the FCCH has been detected, the location of the SCH is known, and it can be received in an idle frame 52 frames after the FCCH using the same timing offset as detected for the FCCH.

Figure 8:
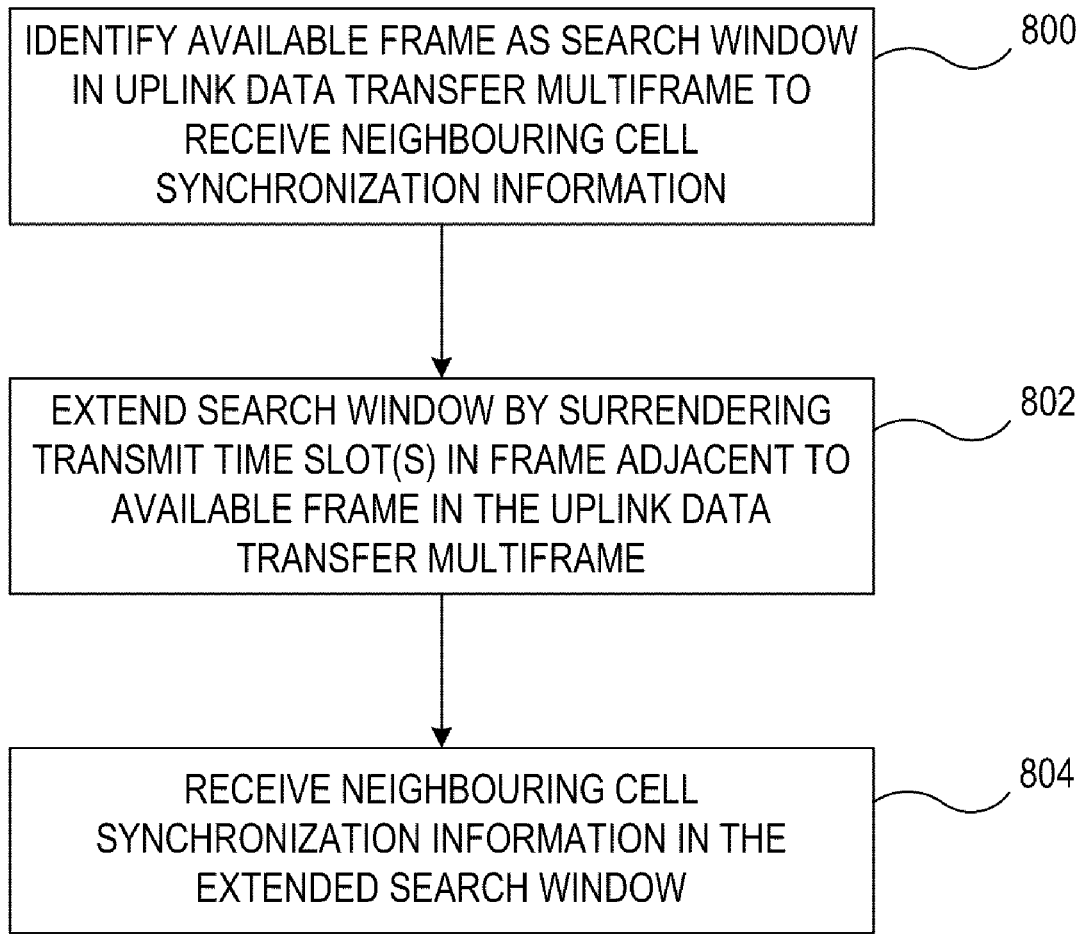
FIG. 8 is a flow diagram illustrating one embodiment for monitoring neighbor cell synchronization channels using a contiguous time slot search window in accordance with the principles of the present invention.

FIG. 8 is a flow diagram illustrating one embodiment for monitoring neighbor cell synchronization channels using a contiguous time slot search window in accordance with the principles of the present invention. An available frame, such as a TDMA idle frame in a data channel, is identified 800 as a search window in the uplink data transfer multiframe. The available frame is identified for receiving neighboring cell synchronization information in the uplink data transfer multiframe. In accordance with the invention, the search window is extended through sacrificing one or more transmit time slots in a frame adjacent to the available frame in the uplink data transfer multiframe, as shown at block 802. For example, in one embodiment of the invention, one or more transmit time slots in the frame immediately preceding the idle frame are skipped in order to provide a number of contiguous time slots necessary to ensure that the neighboring cell synchronization information will be captured, regardless of when during the extended search window the FCCH is provided by the neighboring cell(s). Alternatively, transmit frames in a successive frame may be skipped, depending on the multislot class configuration utilized. For example, in a multislot class and frame configuration where Tx time slots precede Rx time slots, transmit time slots in a frame immediately succeeding the idle frame may be skipped. In any case, neighboring cell synchronization information may then be received 804 in the extended search window. It is noted, however, that this search may be repeated multiple times (such as in thirteen consecutive idle frames) to ensure a place for the neighbor FCCH to occur during one of the search windows, as described above.

Figure 9:
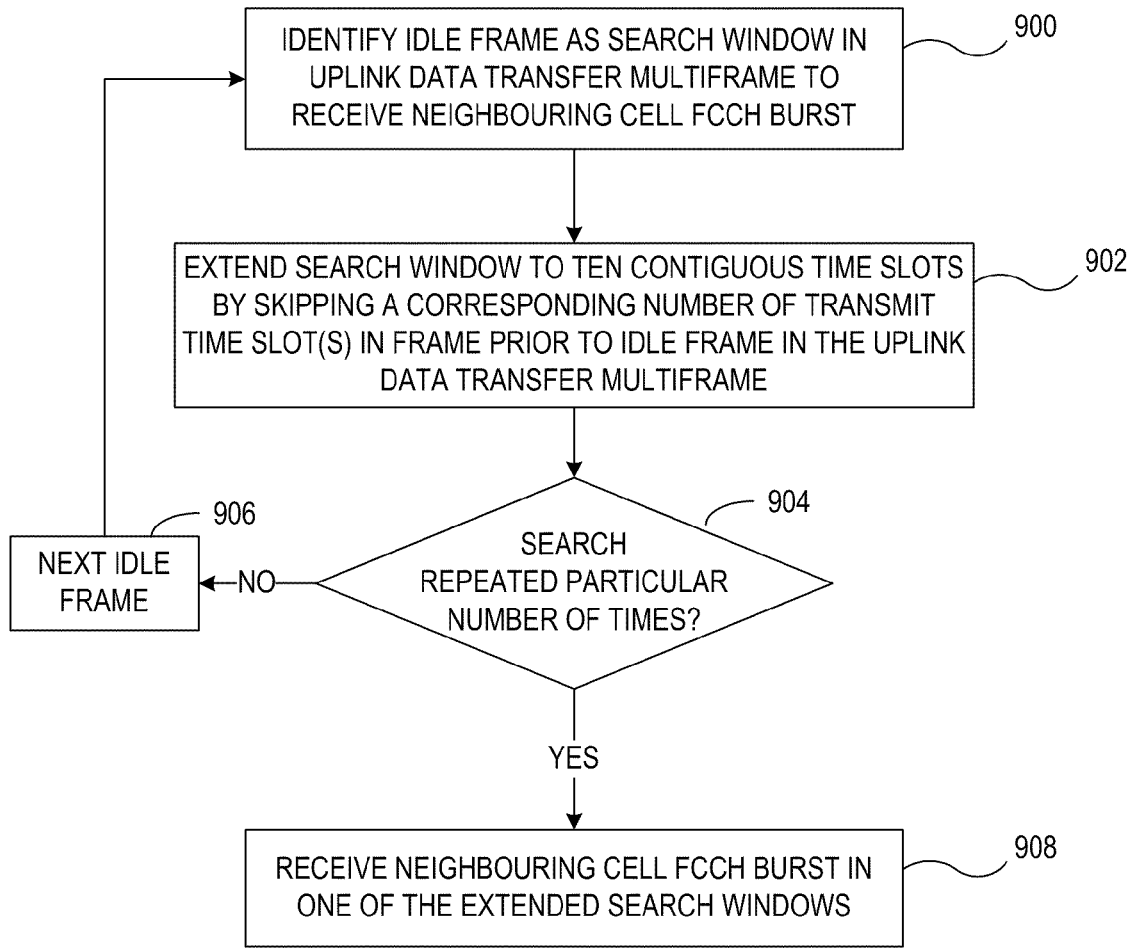
FIG. 9 is a flow diagram illustrating an embodiment for monitoring neighbor cell FCCHs using a contiguous time slot search window in accordance with the principles of the present invention.

FIG. 9 is a flow diagram illustrating an embodiment for monitoring neighbor cell FCCHs using a contiguous time slot search window in accordance with the principles of the present invention. A TDMA idle frame is identified 900 as a search window in the uplink data transfer multiframe, to receive one or more neighboring cell FCCH bursts. The search window is extended 902 to ten contiguous time slots in the illustrated embodiment. This is due to one particular requirement where 9 contiguous time slots are required to ensure receipt of the entire FCCH within an extended search window, and where MS RF circuitry change frequency in half of a time slot. Therefore, the requisite 9 contiguous time slots added to two half time slots results in ten time slots for the extended search window. It will be appreciated by those skilled in the art from the teachings herein that the search window may be extended to different lengths, depending on the length of the received FCCH, the MS RF circuitry speed in changing frequency, the multislot class utilized, etc.

In the illustrated embodiment of FIG. 9, the search window is extended 902 by skipping a corresponding number of transmit time slots in the frame prior to the idle frame in the uplink data transfer multiframe. For example, where ten contiguous time slots are required (for FCCH plus MS RF frequency change), and nine contiguous time slots are available in the original search window, then one Tx time slot will be skipped. Again, a different number of Tx time slots may be skipped, depending on the length of the received FCCH, the MS RF circuitry speed in changing frequency, the multislot class utilized, etc.

In one embodiment, the search may need to be repeated in a plurality of successive idle frames, such that the neighbor synchronization information occurs during one of the extended search windows. For example, in the GSM/GPRS environment, this kind of search is repeated in thirteen consecutive idle frames, the place for the neighbor FCCH burst will occur during one of the search windows. This is due to the different multiframe structures between common control channels (e.g., BCCH) and dedicated/shared channels (e.g., TCH, PDTCH, etc.). In such case, it is determined 904 whether the search has been repeated a particular number of times, such as thirteen times. If not, the next idle frame 906 is considered, and another search window is identified 900. Otherwise, if the search has been repeated the particular number of times, the neighboring cell FCCH burst will be received 908 in one of the extended search windows of the repeated search.

Figure 10:
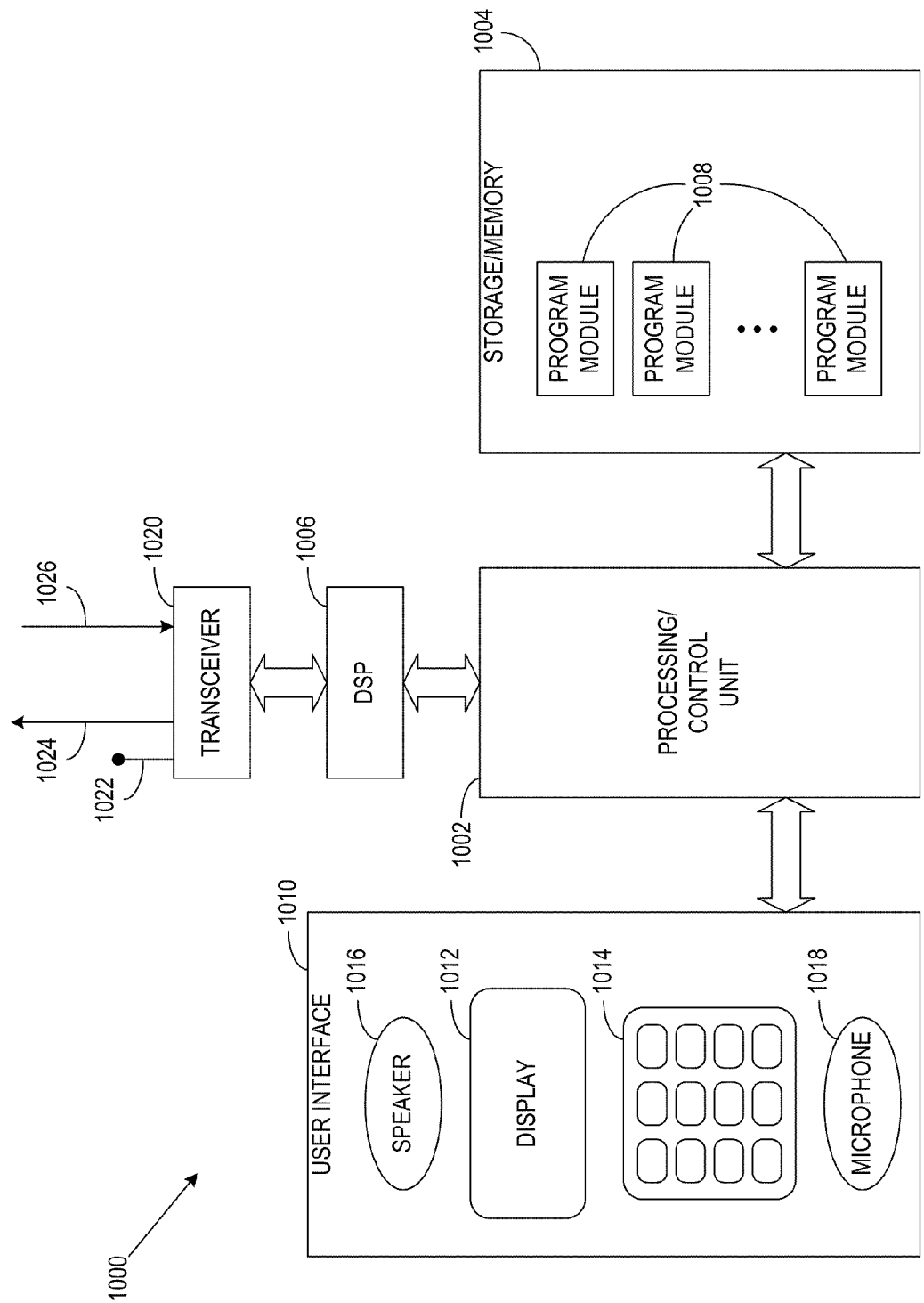
FIG. 10 illustrates a representative mobile station computing system capable of carrying out operations in accordance with the invention.

The present invention may be used with a variety of types of mobile stations, including wireless/cellular telephones, personal digital assistants (PDAs), or other wireless handsets, as well as portable computing devices capable of wireless communication. The mobile stations utilize computing systems to control and manage the conventional device activity as well as the functionality provided by the present invention. Hardware, firmware, software or a combination thereof may be used to perform the various synchronization search window expansion functions and operations described herein. An example of a representative mobile station computing system capable of carrying out operations in accordance with the invention is illustrated in FIG. 10.

The exemplary mobile station (MS) 1000 suitable for performing the synchronization search window expansion functions in accordance with the present invention may be associated with a number of different types of wireless devices. The representative MS 1000 includes a processing/control unit 1002, such as a microprocessor, reduced instruction set computer (RISC), or other central processing module. The processing unit 1002 need not be a single device, and may include one or more processors. For example, the processing unit may include a master processor and associated slave processors coupled to communicate with the master processor.

The processing unit 1002 controls the basic functions of the MS as dictated by programs available in the program storage/memory 1004. Thus, the processing unit 1002 may execute the search window expansion functions associated with the present invention. Alternatively, these search window expansion functions may be implemented in software operable on the Digital Signal Processor 1006, rather than via the MS processing unit 1002. The program storage/memory 1004 may include an operating system and program modules 1008 for carrying out standard functions and applications on the MS, as well as functions associated with the search window expansion functions of the present invention. In one embodiment of the invention, the program modules 1008 are stored in non-volatile electrically-erasable, programmable read-only memory (EEPROM), flash ROM, etc. so that the programs are not lost upon power down of the MS. The program storage may also include one or more of other types of read-only memory (ROM) and programmable and/or erasable ROM, random access memory (RAM), subscriber interface module (SIM), wireless interface module (WIM), smart card, or other removable memory device, etc. The relevant software for carrying out MS operations in accordance with the present invention may also be transmitted to the MS 1000 via data signals, such as being downloaded electronically via one or more networks, such as the Internet and an intermediate wireless network(s).

The processor 1002 and/or DSP 1006, under the direction of one or more program modules 1008, performs search window expansion functions associated with the present invention. For example, in one embodiment of the invention, one or more transmit operations are skipped in the frame immediately preceding the idle frame. The processor 1002 and/or DSP 1006 perform such skipping functions under the control of one or more software/firmware programs associated with program modules 1008. While such functions can alternatively be performed using discrete hardware, these functions are performed using the processor 1002 and/or DSP 1006 in the illustrated embodiment.

For performing other standard MS functions, the processor 1002 is also coupled to user-interface 1010 elements associated with the MS 1000. The user-interface 1010 of the MS may include, for example, a display 1012 such as a liquid crystal display, a keypad 1014, speaker 1016, and microphone 1018. These and other user-interface components are coupled to the processor 1002 as is known in the art. The keypad 1014 includes alpha-numeric keys for performing a variety of functions, including dialing numbers and executing operations assigned to one or more keys. Other user-interface mechanisms may be employed, such as voice commands, switches, touch pad/screen, graphical user interface using a pointing device, trackball, joystick, or any other user interface mechanism. The keypad 1014 will be different depending on the type of MS 1000 utilized.

The MS 1000 also includes conventional circuitry for performing wireless transmissions. The DSP 1006 may be employed to perform a variety of functions, including analog-to-digital (A/D) conversion, digital-to-analog (D/A) conversion, speech coding/decoding, encryption/decryption, error detection and correction, bit stream translation, filtering, etc., as well as the functions associated with the present invention. The transceiver 1020, generally coupled to an antenna 1022, transmits the outgoing radio signals 1024 and receives the incoming radio signals 1026 associated with the MS.

The MS 1000 of FIG. 10 is provided as a representative example of a mobile device in which the principles of the present invention may be applied. From the description provided herein, those skilled in the art will appreciate that the present invention is equally applicable in a variety of other currently known and future mobile devices.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art are readily able to combine software created as described with appropriate general purpose or special purpose computer hardware to create a synchronization search window expansion system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, while the present invention is largely described in terms of GSM/GPRS, the present invention is equally applicable to other networks and services having similar characteristics as it pertains to the receipt of synchronization information from neighboring cells, and those skilled in the art will appreciate from the description provided herein that the principles of the present invention are equally applicable to such other networks and/or services. Thus, it is intended that the scope of the invention be limited not with this detailed description, but rather determined from the claims appended hereto.

What is claimed is:

1. An apparatus comprising:
a processor configured to use at least one available frame as a search window in an uplink data transfer multiframe for receiving neighboring cell synchronization information, and to extend the search window by skipping one or both of at least one transmit time slot in one of the frames adjacent to the available frame in the uplink data transfer multiframe and at least one receive time slot in one of the frames adjacent to the available frame in the uplink data transfer multiframe; and
a receiver configured to receive the neighboring cell synchronization information in the extended search window from neighboring base transceiver stations.

2. The apparatus of claim 1, wherein the processor comprises a processor device operating under the direction of one or more program modules having instructions to direct the processor to skip the one or more transmit time slots in the frame adjacent to the available frame.

3. The apparatus of claim 1, wherein the processor comprises a digital signal processor operating under the direction of one or more program modules having instructions to direct the digital signal processor to skip the one or more transmit time slots in the frame adjacent to the available frame.

4. The apparatus of claim 1, wherein the available frame comprises a defined Idle Frame in the uplink data transfer multiframe.

5. The apparatus of claim 4, wherein the processor is configured to extend the search window by skipping at least one transmit time slot in the frame immediately preceding the Idle Frame.

6. The apparatus of claim 1, where in the processor is further configured to skip as many transmit slots as necessary to provide the extended search window with a size capable of accommodating all of the neighboring cell synchronization information.

7. The apparatus of claim 1, wherein the processor is configured to skip both the transmit time slot and the receive time slot, wherein the at least one receive time slot is skipped in the frame adjacent to the available frame and opposite the frame in which the at least one transmit time slot is skipped.

8. The apparatus of claim 7, wherein the available frame comprises a defined Idle Frame in the uplink data transfer multiframe and the processor is further configured to extend the search window by skipping at least one transmit time slot in the frame immediately preceding the Idle Frame and skipping at least one receive time slot in the frame immediately subsequent the Idle Frame.

9. The apparatus of claim 7, wherein the processor is further configured to skip as many transmit and receive time slots as necessary to provide the extended search window with a size capable of accommodating all of the neighboring cell synchronization information.

10. The apparatus of claim 1, wherein the processor is further configured to use any one or more frames in the uplink data transfer multiframe having a plurality of contiguous available time slots.

11. A system comprising:
(a) a plurality of cells each defined by a base transceiver station;
(b) at least one mobile station for communicating with a plurality of the base transceiver stations neighboring the cell in which the mobile station is currently operating, wherein the mobile station comprises:
(i) a processor configured to use at least one available frame as a search window in an uplink data transfer multiframe for receiving neighboring cell synchronization information, and to extend the search window by skipping at least one transmit time slot in one of the frames adjacent to the available frame in the uplink data transfer multiframe or skipping at least one receive time slot in one of the frames adjacent to the available frame in the uplink data transfer multiframe; and
(ii) a receiver configured to receive the neighboring cell synchronization information in the extended search window from neighboring base transceiver stations.

12. The system of claim 11, wherein the system is operable in a GSM network.

13. The system of claim 11, wherein the available frame comprises a defined Idle Frame in the uplink data transfer multiframe.

14. The system of claim 13, wherein the processor is further configured to extend the search window by skipping at least one transmit time slot in the frame immediately preceding the defined Idle Frame.

15. The system of claim 11, wherein the mobile station is associated with a mobile station multislot class which accommodates fewer consecutive available time slots than are available in the search window prior to extension.

16. The system of claim 11, wherein the mobile station comprises a mobile station type where transmit and receive operations are not simultaneously performed.

17. A method, comprising:
utilizing, via a processor, at least one available frame as a search window in an uplink data transfer multiframe for receiving neighboring cell synchronization information;
skipping, via the processor, one or both of at least one transmit time slot and at least one receive time slot in respective frames adjacent to the available frame in the uplink data transfer multiframe to extend the search window; and
receiving, via a receiver, the neighboring cell synchronization information in the extended search window.

18. The method of claim 17, wherein skipping at least one transmit time slot in a frame adjacent to the available frame comprises skipping at least one transmit time slot in a frame immediately preceding the available frame.

19. The method of claim 18, wherein skipping at least one receive time slot in a frame adjacent to the available frame comprises skipping at least one receive time slot in a frame immediately following the available frame.

20. The method of claim 17, wherein skipping both the transmit time slot and the receive time slot comprises skipping as many transmit and receive time slots as necessary to provide the extended search window at a size capable of accommodating all of the neighboring cell synchronization information.

21. An apparatus comprising:
a processor configured to use at least one available frame as a search window in an uplink data transfer multiframe for receiving neighboring cell synchronization information, and to extend the search window by skipping at least one transmit time slot in one of the frames adjacent to the available frame in the uplink data transfer multiframe; and
a receiver configured to receive the neighboring cell synchronization information in the extended search window from neighboring base transceiver stations.

* * * * *